United States Patent Office 3,123,602
Patented Mar. 3, 1964

3,123,602
PROCESS FOR THE PREPARATION OF 3β-OXY-20-OXO-16β-METHYLPREGNANES AND INTERMEDIATES PRODUCED THEREIN
Kikuo Igarashi, Osaka, Japan, assignor to Shionogi & Co., Ltd., Osaka, Japan
No Drawing. Filed Nov. 21, 1962, Ser. No. 239,359
Claims priority, application Great Britain Oct. 15, 1962
5 Claims. (Cl. 260—239.57)

The present invention relates to steroids of the pregnane series. More particularly, it relates to 3β-hydroxy- or alkanoyloxy-20-oxo-16β-methylpregnanes, intermediates therefor and production thereof.

The process of the present invention is illustratively shown by the following formulae:

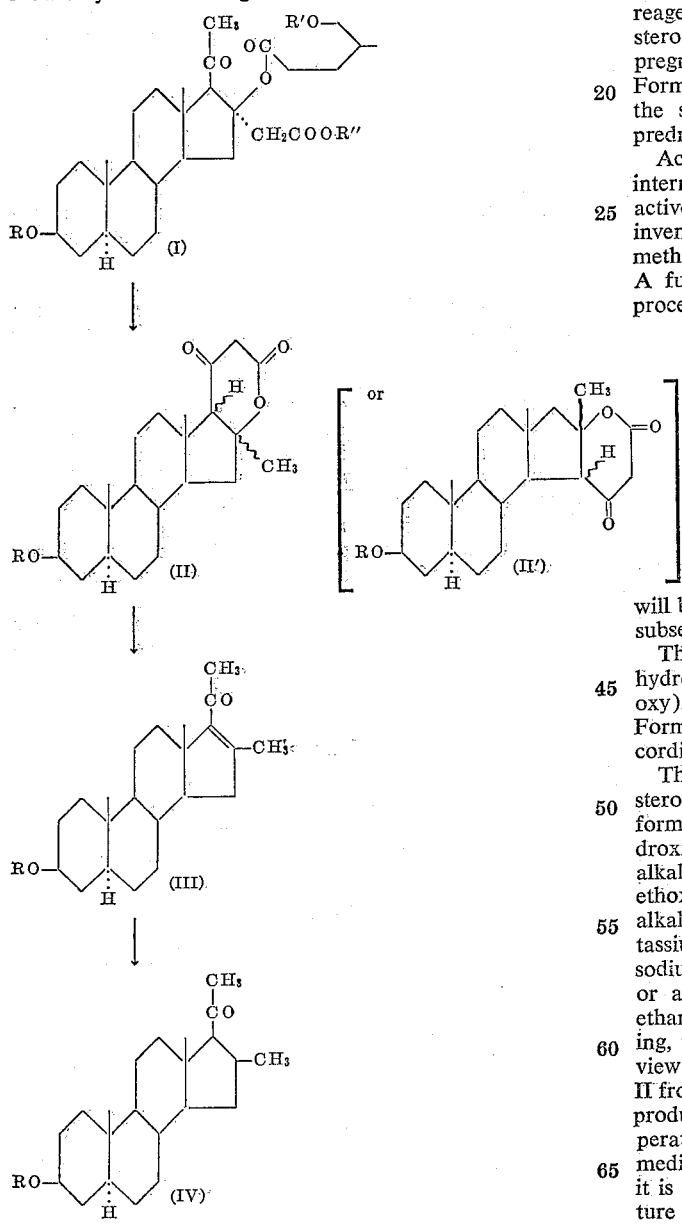

wherein R and R' are each hydrogen or lower alkanoyl (e.g. acetyl, propionyl, butyryl, valeryl, etc.), R" is hydrogen or lower alkyl (e.g. methyl, ethyl, propyl, butyl, etc.) and the ripple mark (⌇) represents an undetermined configuration. The formulae should be understood as showing the substantial conversion; the 3-alkanoyloxy radical in some compounds shown therein may be changed to the hydroxyl radical, depending on the reagent used, in the course of reaction in some steps. However, the resulting hydroxyl compound can be easily changed into the corresponding alkanoyloxy compound by a conventional esterification procedure. The chemical structure of the compound corresponding to Formula II has not yet been confirmed, and it may be alternatively assigned Formula II'. However, in the present specification, the compound is tentatively assigned Formula II for the convenience in illustration.

According to the present invention, the steroidal lactone of Formula II can be obtained in a high yield from compound I by the careful control of the reaction conditions such as reaction time, reaction temperature and reagent. Furthermore, according to this invention, the steroidal lactone II can be readily converted into the pregnene of Formula III and then the pregnane of Formula IV, the latter being useful as an intermediate in the synthesis of betamethasone (9α-fluoro-16β-methylprednisolone).

Accordingly, one object of the invention is to provide intermediates in the synthesis of a known physiologically active steroid, betamethasone. Another object of the invention is to provide a process for synthesizing betamethasone from a naturally existing steroid, kryptogenin. A further object is to provide the pregnane IV and a process for preparing the same. These and other objects will be apparent to those conversant with the art from the subsequent description.

The starting material of the present invention is 3β-hydroxy-20-oxo-16β-(γ-hydroxymethylvaleroyloxy)-5α-pregnane-16α-acetic acid or its derivative of Formula I, which can be prepared from kryptogenin according to a known method [U.S. Patent 3,043,834].

The conversion of the steroidal acetic acid I into the steroidal lactone II can be accomplished by treating the former with a basic substance such as alkali metal hydroxide (e.g. sodium hydroxide, potassium hydroxide), alkali metal alkoxide (e.g. sodium methoxide, sodium ethoxide, potassium methoxide, potassium ethoxide), alkali metal bicarbonate (e.g. sodium bicarbonate, potassium bicarbonate) and alkali metal acetate (e.g. sodium acetate, potassium acetate) in a suitable hydrous or anhydrous organic solvent medium (e.g. methanol, ethanol, benzene, toluene, acetic acid). Generally speaking, the use of a strongly basic substance is preferred in view of easy isolation of the produced steroidal lactone II from the reaction mixture including the unavoidable by-product. Care must be taken to correlate reaction temperature conditions to the character of the solvent medium. Thus, when a hydrous medium is employed, it is necessary that a low temperature—as e.g. a temperature within the range from about 0° C. to about 20° C.—be employed in order to assure that the course of the reaction is favorable to the production of compound II. Similarly, when an anhydrous medium is employed, a low temperature must be avoided and a high temperature, e.g. reflux temperature, must be used in order to realize the desired production of compound II. The employment of a high temperature in a water-containing reaction medium will favor the occurrence of undesired side reaction. Thus, the reaction can proceed at a temperature lower than about 30° C. when water is present, but a higher temperature, normally refluxing, is preferred from the standpoint of the production of the steroidal lactone II in optimum high yield, but water must in such case be excluded from the reaction medium. Usually, the reaction may be completed in from about 30 minutes to about 10 hours, the lower temperature requiring the longer reaction time. A short reaction time, e.g. around 10 minutes, can yield the steroidal lactone II, even if the reaction temperature is high.

The reaction product may in some cases be a mixture of the steroidal lactone II with 3β-hydroxy-20-oxo-5α-16(17)-pregnen-16-acetic acid and/or [13β,20-dihydroxy-5α-17(20)-pregnen-16-yliden]-acetic acid lactone, the latter two compounds being respectively representable by the formulae:

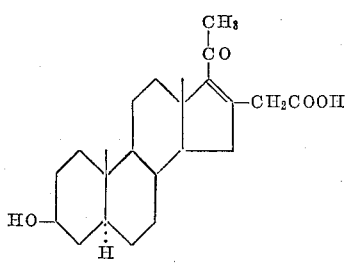

(A)

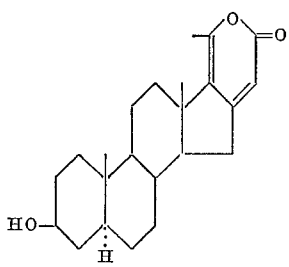

(B)

The by-production of either or both of these two compounds is unavoidable. However, these by-products can be removed from the reaction mixture by a simple procedure such as extraction, recrystallization or chromatography. For instance, the reaction mixture is diluted with water and then shaken with a suitable water-immiscible organic solvent (e.g. dichloromethane, chloroform, carbon tetrachloride) in neutrality or alkalinity whereby the steroidal lactone II and the compound of Formula A are retained in the aqueous layer, while the compound of Formula B is removed to the organic solvent layer. The separation of the steroidal lactone II from its mixture with the compound A may be accomplished by utilizing the difference between their solubilities in a suitable organic solvent. For instance, the mixture thereof is treated with acetone whereby the steroidal lactone II is firstly crystallized out and the compound A is obtained from the mother liquor. Generally speaking, the elimination of the compound B from the reaction mixture is easier than that of the compound A. Accordingly, it is preferred to carry out the reaction using a strongly basic substance at a high temperature, usually while refluxing, in a relatively long reaction time so that the by-production of the compound A can be suppressed.

The thus-produced steroidal lactone II is subjected to decarboxylation to give the pregnene III. The decarboxylation can be accomplished by heating the steroidal lactone II with an acidic substance (e.g. sulfuric acid, hydrochloric acid, acetic acid) in a suitable water-miscible organic solvent medium (e.g. tetrahydrofuran, dioxane) while refluxing. Normally, it takes from 1 to 3 hours for accomplishment of the reaction. A short reaction time usually results in the by-production of either or both of the compounds representable by the formulae:

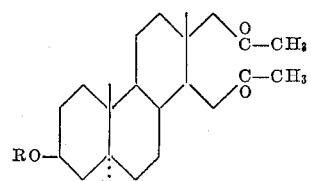

(C)

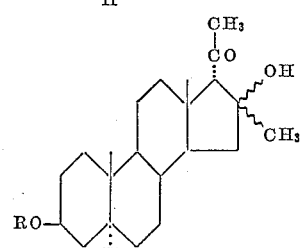

(D)

wherein R has the same significance as designated above. However, these by-products can be readily converted into the pregnene III by repetition of the treatment with an acidic substance as stated above.

The resulting pregnene III is reduced in a per se conventional manner to give the pregnane IV. For instance, the catalytic reduction of the pregnene III in the presence of palladium-carbon or platinum dioxide in a suitable organic solvent medium (e.g. methanol, ethanol, ethyl acetate) affords the pregnane IV.

The thus-obtained pregnane IV can be converted into a known physiologically active steroid, betamethasone (9α-fluoro-16β-methylprednisolone), according to a per se conventional manner [Oliveto et al.: J. Am. Chem. Soc., 80, 4431 (1958)]. Further, the steroidal lactone II per se possesses a considerable anti-DOCA (desoxycorticosterone acetate) activity. For instance, it results in the complete inhibition of the action caused by 10 micrograms of DOCA, when subcutaneously administered to rats at the dosage of 1 milligram. Thus, the steroidal lactone II is useful as an anti-DOCA agent.

The following examples represent presently-preferred embodiments of the present invention, but it is to be understood that the examples are given by way of illustration only and not of limitation. The abbreviations used in these examples are intended to have the following meanings: g., gram(s); mg., milligram(s); ml., millilitre(s); and ° C., degrees centigrade. Other abbreviations have each a conventional meaning.

*Example 1*

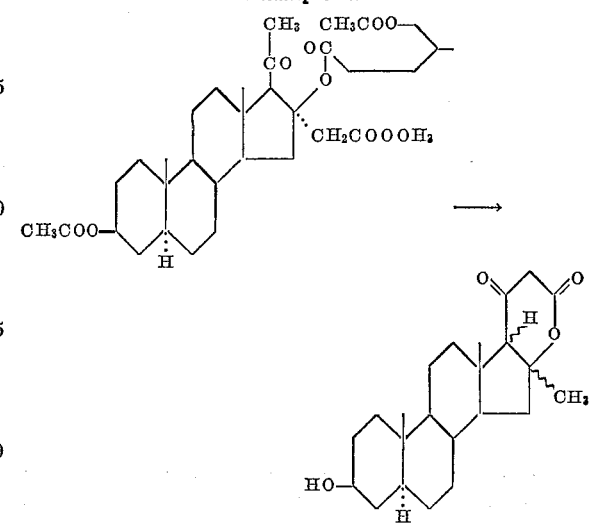

Methyl 3β-acetoxy-20-oxo-16β-(γ-acetoxymethylvaleroyloxy)-5α-pregnan-16α-acetate (1.004 g.) is added to the anhydrous ethanolic solution of sodium ethoxide prepared from metallic sodium (400 mg.) and anhydrous ethanol (4 ml.), and the resultant solution is refluxed for 1 hour on a water bath. Then, the reaction mixture is poured into water and shaken with chloroform. The aqueous layer is acidified with dilute hydrochloric acid and shaken with chloroform. The chloroform layer is washed with water and dried, and the solvent removed under reduced pressure. The residue is crystallized from methanol to give 3β-hydroxy-16ξ-methyl-5α,16ξ,17ξ-androsta[16,17-2′,3′]pyrane-4′,6′-dione in a yield of 24.1%.

M.P., 263 to 265° C. (decomp.).

O.R.: $[\alpha]_D^{27°}+115.0°\pm2°$ (in ethanol, c.=1.012).

Analysis.—Calcd. for $C_{23}H_{34}O_4$: C, 73.76; H, 9.15. Found: C, 73.86; H, 9.30.

U.V.: $\lambda_{max}$ 251 mμ (ε, 9250). When a drop of N/10 NaOH is added, $\lambda_{max}$ 278 mμ (ε, 17,850).

I.R.: $\lambda_{max.}^{Nujol}$ cm.$^{-1}$, 3240 (OH); 1678; 1658; 1620.

Molecular weight: 678,525.

Example 2

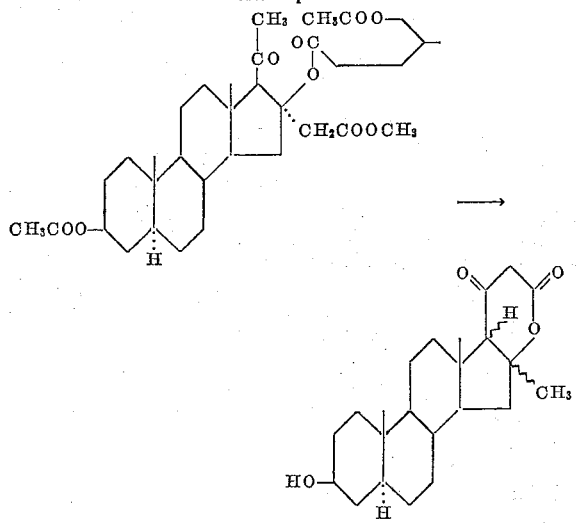

Methyl 3β-acetoxy-20-oxo-16β-(γ-acetoxymethylvaleroyloxy)-5α-pregnan-16α-acetate (1.011 g.) is added to the solution of potassium hydroxide (410 mg.) in water (2 ml.) and methanol (12 ml.), and the resultant solution is stirred for 1 hour at a temperature from 0 to 5° C. Then, the resulting mixture is poured into water, acidified with dilute hydrochloric acid and shaken with chloroform. The chloroform layer is washed with water and dried, and the solvent removed under reduced pressure. To the residue, there is added a solution of potassium bicarbonate (2.0 g.) in 80% methanol (20 ml.), and the resulting solution is refluxed for 2 hours on a water bath. The reaction mixture is treated as in Example 1 to give 3β-hydroxy-16ξ-methyl-5α-16ξ,17ξ-androsta[16,17-2′,3′]pyrane-4′,6′-dione in a yield of 23.6%.

Example 3

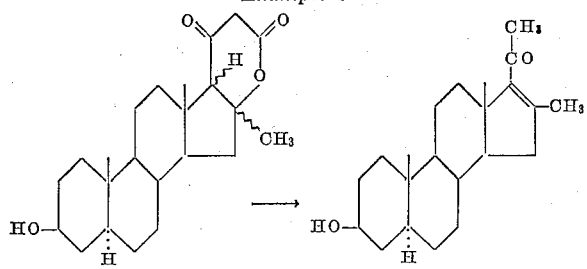

A solution of 3β-hydroxy-16ξ-methyl-5α,16ξ,17ξ-androsta[16,17-2′,3′]pyrane-4′,6′-dione (1.000 g.) in a mixture of dioxane (143 ml.) and 20% sulfuric acid (61 ml.) is refluxed for 1.5 hours. The reaction proceeds with the generation of carbon dioxide gas, which can be confirmed by passing through an aqueous solution of barium hydroxide. Then, the reaction mixture is poured into water and shaken with ether. The ether layer is washed with water, dilute aqueous solution of sodium carbonate and water in turn and dried over anhydrous sodium sulfate. Removing the solvent, the residue is crystallized out from a mixture of ether and petroleum ether and recrystallized from the same solvent to give 3β-hydroxy-16-methyl-20-oxo-5α-16(17)-pregnene in a yield of 44.8%.

M.P., 183.5 to 185° C.

O.R.: $[\alpha]_D^{22°}-11°\pm2°$ (in ethanol, c.=0.989).

Analysis.—Calcd. for $C_{22}H_{34}O_2$: C, 79.95; H, 10.37. Found: C, 80.20; H, 10.47.

I.R.: $\lambda_{max.}^{Nujol}$ cm.$^{-1}$, 3410 (OH); 1634; 1600 (α, β-unsaturated ketone).

I.R.: $\lambda_{max.}^{CHCl_3}$ cm.$^{-1}$, 3612; 3440 (OH); 1652; 1600.

U.V.: $\lambda_{max.}^{95\% \text{ ethanol}}$ 252 mμ (ε, 9500).

3β-hydroxy-16-methyl-20-oxo-5α-16(17)-pregnene is mixed with acetic anhydride and pyridine and allowed to stand at room temperature overnight. By recrystallization of the reaction product from a mixture of ether and petroleum ether, there is obtained 3β-acetoxy-16-methyl-20-oxo-5α-16(17)-pregnene.

M.P., 173 to 174° C.

O.R.: $[\alpha]_D^{24.5°}-22.7°\pm2°$ (in chloroform, c.=1.043).

Analysis.—Calcd. for $C_{24}H_{36}O_3$: C, 77.37; H, 9.74. Found: C, 77.36; H, 9.76.

I.R.: $\lambda_{max.}^{Nujol}$ cm.$^{-1}$, 1729 (acetate); 1652; 1597 (α, β-unsaturated ketone).

I.R.: $\lambda_{max.}^{CHCl_3}$ cm.$^{-1}$, 1723 (acetate); 1652; 1601.

U.V.: $\lambda_{max.}^{95\% C_2H_5OH}$ 252.5 mμ (ε, 9700).

Example 4

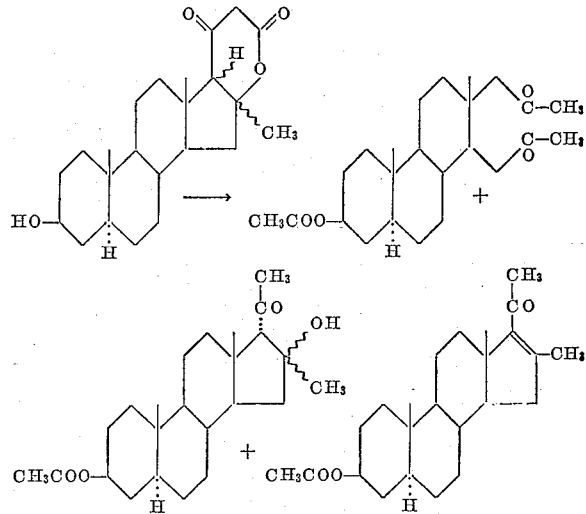

A solution of 3β-hydroxy-16ξ-methyl-5α,16ξ,17ξ-androsta[16,17-2′,3′]pyrane-4′,6′-dione (500 mg.) in a mixture of dioxane (71 ml.) and 20% sulfuric acid (31 ml.) is refluxed for 11 minutes. Then, the reaction mixture is poured into water and shaken with ether. The ether extract is washed with water, aqueous sodium carbonate solution and water in turn and dried over anhydrous sodium sulfate. On removal of the solvent, there is obtained the residue (478 mg.), which is allowed to stand with acetic anhydride (1 ml.) and pyridine (5 ml.) overnight at room temperature (15 to 20 C.), whereby the crude acetylated substance (509 mg.) is obtained. The acetylated substance is chromatographed on alumina (15 g).

The eluate with petroleum ether is crystallized from a mixture of ether and petroleum ether to give 3β-acetoxy-16-methyl-20-oxo-5α-16(17)-pregnene (81 mg.).

The eluates with petroleum ether and a mixture of petroleum ether and benzene (8:2–7:3) are crystallized from a mixture of ether and petroleum ether to give 3β-acetoxy-16-methyl-16,20-dioxo-16,17-seco - 5α - pregnane (91 mg).

M.P., 138 to 139° C.

O.R.: [α]$_D^{23.5}$ +17.5°±2° (in chloroform, c.=1.037).

Analysis.—Calcd. for $C_{24}H_{38}O_3$: C, 73.80; H, 9.81. Found: C, 73.83; H, 9.78.

I.R.: λ$_{max.}^{Nujol}$ cm.$^{-1}$, 1732 (acetate); 1714; 1693 (C=O).

I.R.: λ$_{max.}^{CHCl_3}$ cm.$^{-1}$, 1720; 1713; 1700.

The eluates with a mixture of petroleum ether and benzene (6:4–1:1), benzene and a mixture of benzene and ether (8:2) are crystallized from a mixture of ether and petroleum ether to give 3β-acetoxy-16ξ-hydroxy-16ξ-methyl-20-oxo-5α,17α-pregnane (81 mg.).

M.P. 188 to 190° C.

O.R.: [α]$_D^{22.5}$ −40.5°±2° (in chloroform, c.=1.011).

Analysis.—Calcd. for $C_{24}H_{38}O_3$: C, 73.80; H, 9.81. Found: C, 73.57; H, 9.85.

I.R.: λ$_{max.}^{Nujol}$ cm.$^{-1}$, 3595 (OH); 1722 (acetate); 1704 (C=O)

I.R.: λ$_{max.}^{CHCl_3}$ cm.$^{-1}$, 3626 (OH); 1723 (acetate); 1710 (C=O)

3β - acetoxy - 16ξ - methyl-20-oxo-5α, 17α-pregnane is treated with potassium carbonate in a mixture of methanol and water at room temperature to give 3β,16ξ-dihydroxy-16ξ-methyl-20-oxo-5α,17α-pregnane.

M.P., 241.5 to 243° C.

O.R.: [α]$_D^{22.5}$ −34.3°±2° (in ethanol, c.=1.072).

Analysis.—Calcd. for $C_{22}H_{36}O_3$: C, 75.81; H, 10.41. Found: C, 75.96; H, 10.64.

I.R.: λ$_{max.}^{Nujol}$ cm.$^{-1}$, 3390 (OH); 1691 (C=O)

*Example 5*

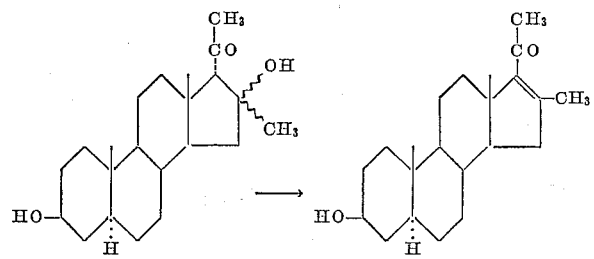

3β,16ξ - dihydroxy - 16ξ - methyl - 20 - oxo - 5α,17α-pregnane is heated in a mixture of dioxane and sulfuric acid for 1 hour to give 3β-hydroxy-16-methyl-20-oxo-5α-16(17)-pregnene.

*Example 6*

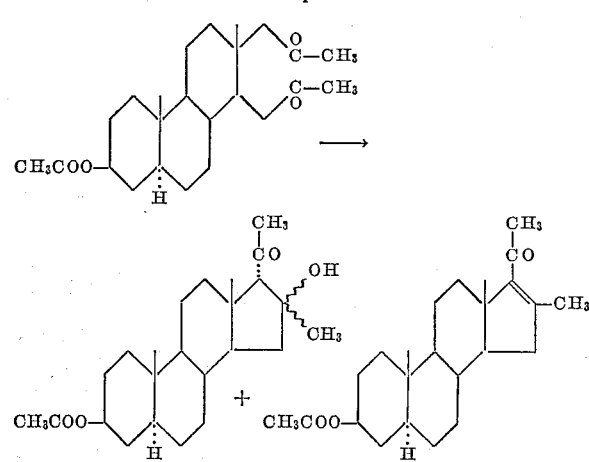

3β - acetoxy - 16 - methyl-16,20-dioxo-16,17-seco-5α-pregnane is refluxed in a mixture of dioxane and sulfuric acid for 20 minutes. The resulting substance is acetylated with pyridine and acetic anhydride. The reaction product is chromatographed on alumina to give 3β-acetoxy-16ξ-hydroxy-16ξ-methyl-20-oxo-5α,17α-pregnane and 3β-acetoxy-16-methyl-20-oxo-5α-16(17)-pregnene.

*Example 7*

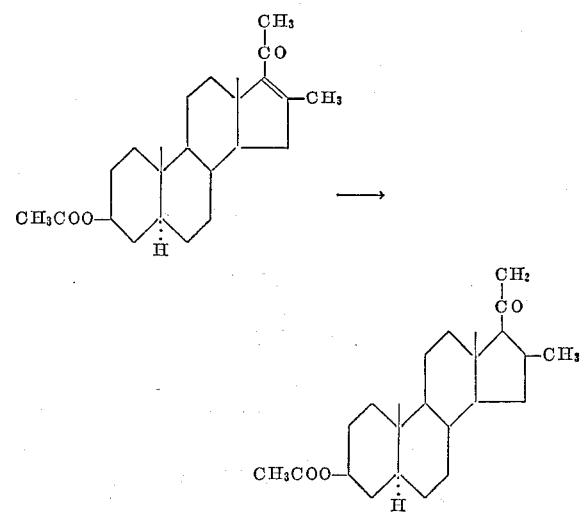

A solution of 3β-acetoxy-16-methyl-20-oxo-5α-16(17)-pregnene (200 mg.) in methanol (50 ml.) is shaken with palladium-carbon (200 mg.) in hydrogen stream for 5 hours. Then, the catalyst is separated by filtration and the filtrate is condensed to precipitate crude crystals, which are recrystallized from methanol to give 3β-acetoxy-16β-methyl-20-oxo-5α-pregnane (168 mg.).

M.P. 148 to 149° C.

O.R.: [α]$_D^{25}$ +33.3°±2° (in ethanol, c.=0.980).

I.R.: λ$_{max.}^{Nujol}$ cm.$^{-1}$, 1730 (acetate); 1711 (C=O)

I.R.: λ$_{max.}^{CHCl_3}$ cm.$^{-1}$, 1725

I.R.: λ$_{max.}^{CCl_4}$ cm.$^{-1}$, 1733 (acetate); 1710 (C=O)

U.V.: λ$_{max.}^{95\% ethanol}$ 290 mμ (ε, 39)

3β - acetoxy - 16β - methyl - 20 - oxo - 5α - pregnane is hydrolyzed with alkali to give 3β-hydroxy-16β-methyl-20-oxo-5α-pregnane.

Having thus disclosed the invention, what is claimed is:

1. A compound of the formula:

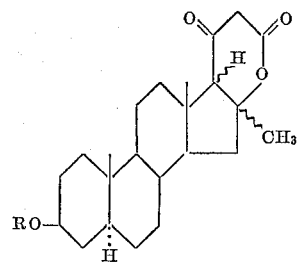

wherein R is a member selected from the group consisting of hydrogen and lower alkanoyl and the ripple mark (ξ) represents an undetermined configuration.

2. A compound of the formula

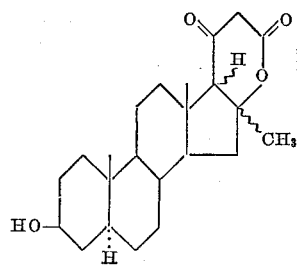

3. Process for preparing steroid which comprises heating a compound of the formula:

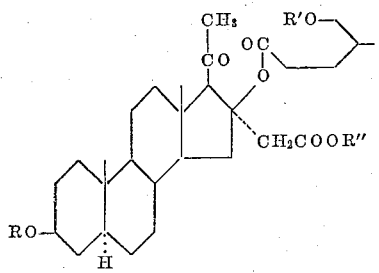

wherein each of R and R' is a member selected from the group consisting of hydrogen and lower alkanoyl and R" is a member selected from the group consisting of hydrogen and lower alkyl in an anhydrous medium containing an alkaline substance selected from the group consisting of alkali metal hydroxide, alkali metal alkoxide, alkali metal bicarbonate and alkali metal acetate, isolating from the acid fraction of the reaction mixture a compound of the formula:

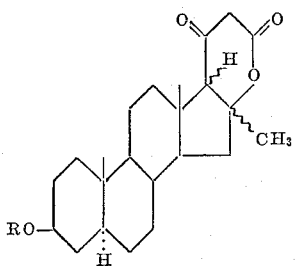

wherein R is a member selected from the group consisting of hydrogen and lower alkanoyl and the ripple mark ($\wr$) represents an undetermined configuration, heating the isolated compound with a member selected from the group consisting of sulfuric acid, hydrochloric acid and acetic acid in a water-miscible organic solvent, and reducing with catalytic hydrogen the resulting compound of the formula:

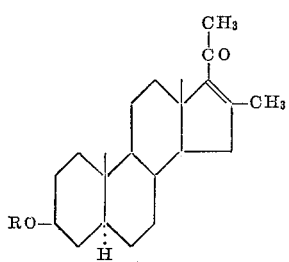

wherein R is a member selected from the group consisting of hydrogen and lower alkanoyl, to the compound of the formula:

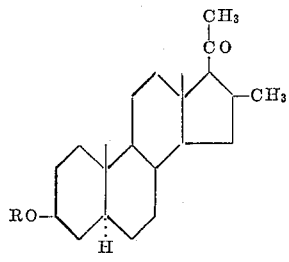

wherein R is a member selected from the group consisting of hydrogen and lower alkanoyl, and recovering the latter compound.

4. In a process for preparing steroid, the step of converting a compound of the formula

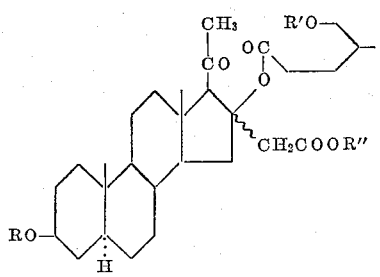

wherein each of R and R' is a member selected from the group consisting of hydrogen and lower alkanoyl and R" is a member selected from the group consisting of hydrogen and lower alkyl, into a compound of the formula

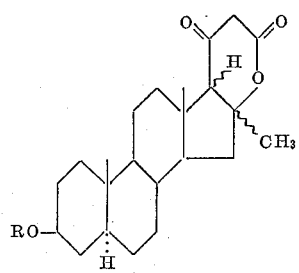

wherein R is a member selected from the group consisting of hydrogen and lower alkyl and the ripple mark ($\wr$) represents an undetermined configuration, the step of refluxing a compound of the first formula in an anhydrous medium containing a member selected from the group consisting of alkali metal hydroxide, alkali metal alkoxide, alkali metal bicarbonate and alkali metal acetate, and recovering a compound of the second formula.

5. In a process for preparing steroid, the step of converting a compound of the formula

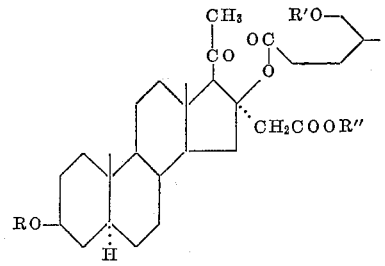

wherein each of R and R' is a member selected from the group consisting of hydrogen and lower alkanoyl and R" is a member selected from the group consisting of hydrogen and lower alkyl, into a compound of the formula

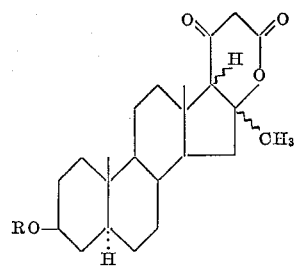

wherein R is a member selected from the group consisting of hydrogen and lower alkyl and the ripple mark ($\wr$)

represents an undetermined configuration, the step of intimately admixing by stirring a compound of the first formula with an aqueous medium containing a member selected from the group consisting of alkali metal hydroxide, alkali metal alkoxide, alkali metal bicarbonate and alkali metal acetate at a temperature of 0° C. to 20° C., and recovering a compound of the second formula.

References Cited in the file of this patent

Ruggieri et al.: Gazz. Chim. Ital., June 1961, pp. 686–705, p. 689 relied upon.

Ruggieri: Farmaco Sci. Ed., August 1961, pp. 583–590, p. 585 relied upon.

Bailey et al.: J. Chem. Soc., May 1962, pp. 1578–1591, p. 1580 relied upon.